US 11,151,298 B1

(12) United States Patent
Singh et al.

(10) Patent No.: US 11,151,298 B1
(45) Date of Patent: Oct. 19, 2021

(54) METAL TRACK ROUTING WITH BUFFER BANK INSERTION

(71) Applicant: XILINX, INC., San Jose, CA (US)

(72) Inventors: Jasmeet Singh, Hyderabad (IN); Nisarg Pandya, Hyderabad (IN); Subbarao Govardhanagiri, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/691,311

(22) Filed: Nov. 21, 2019

(51) Int. Cl.
*G06F 30/00* (2020.01)
*G06F 30/394* (2020.01)
*G06F 30/392* (2020.01)
*G06F 30/337* (2020.01)
*G06F 30/398* (2020.01)

(52) U.S. Cl.
CPC .......... *G06F 30/394* (2020.01); *G06F 30/337* (2020.01); *G06F 30/392* (2020.01); *G06F 30/398* (2020.01)

(58) Field of Classification Search
CPC .... G06F 30/394; G06F 30/337; G06F 30/392; G06F 30/398
See application file for complete search history.

(56) References Cited

U.S. PATENT DOCUMENTS

| | | | |
|---|---|---|---|
| 5,502,644 A * | 3/1996 | Hamilton | G06F 30/367 716/115 |
| 5,812,414 A * | 9/1998 | Butts | G06F 30/331 716/103 |
| 6,110,221 A * | 8/2000 | Pai | G06F 30/39 326/82 |
| 6,543,040 B1 * | 4/2003 | Bednar | G06F 30/39 716/127 |
| 6,629,298 B1 * | 9/2003 | Camporese | G06F 30/33 716/113 |
| 6,664,638 B2 * | 12/2003 | Ushiyama | G06F 30/394 257/773 |

(Continued)

OTHER PUBLICATIONS

Xu, Xiaoqing et al. "Standard Cell Pin Access and Physical Design in Advanced Lithography," Optical Microlithography XXIX, Mar. 2016, pp. 1-13.

(Continued)

*Primary Examiner* — Naum Levin
(74) *Attorney, Agent, or Firm* — Patterson + Sheridan, LLP

(57) ABSTRACT

Examples described herein provide for a technique for metal track routing with buffer bank insertion in a representation of a hardware design of an integrated circuit. In an example, pins of ports of hardblocks in a placed layout are identified. Logical tracks for nets associated with the pins of the ports are generated and assigned to respective metal layers. Logical tracks and corresponding nets are grouped into respective groups. Buffer bank(s) is inserted into the placed layout. Each buffer bank is for a group of logical tracks and divides each logical track and net of the group of logical tracks. Each buffer bank has pins associated with the respective divided nets. Each pin of the buffer bank(s) is assigned to a middle or higher metal layer. Metal tracks are generated in a representation of a hardware layout based on the logical tracks and pins of the ports and buffer bank(s).

20 Claims, 13 Drawing Sheets

(56) References Cited

U.S. PATENT DOCUMENTS

| | | | | |
|---|---|---|---|---|
| 6,738,959 B2* | 5/2004 | Jung | ............. | G06F 30/394 716/114 |
| 6,832,362 B2* | 12/2004 | Nuber | ............. | G06F 30/392 716/114 |
| 7,036,104 B1* | 4/2006 | Alpert | ............. | G06F 30/327 716/114 |
| 7,519,927 B1* | 4/2009 | Hryckowian | ............. | G06F 30/394 716/100 |
| 7,689,963 B1* | 3/2010 | Masleid | ............. | G06F 1/10 716/129 |
| 7,739,624 B2* | 6/2010 | McElvain | ............. | G06F 30/394 716/101 |
| 8,024,690 B2* | 9/2011 | Gitchev | ............. | G06F 30/394 716/128 |
| 8,230,375 B2* | 7/2012 | Madurawe | ............. | G06F 30/39 716/117 |
| 8,365,120 B2* | 1/2013 | Alpert | ............. | G06F 30/394 716/113 |
| 8,370,783 B2* | 2/2013 | Uchino | ............. | G06F 30/394 716/131 |
| 8,407,650 B1 | 3/2013 | Avidan et al. | | |
| 8,863,066 B1* | 10/2014 | Kozhaya | ............. | G06F 30/394 716/126 |
| 9,280,632 B2 | 3/2016 | Adya et al. | | |
| 10,360,341 B2* | 7/2019 | Chakraborty | ............. | G06F 30/39 |
| 10,579,554 B2* | 3/2020 | Kim | ............. | G06F 13/4282 |
| 2006/0214683 A1* | 9/2006 | DeHon | ............. | H03K 19/17728 326/41 |
| 2009/0288056 A1* | 11/2009 | Gitchev | ............. | G06F 30/394 716/126 |
| 2018/0113820 A1* | 4/2018 | Kim | ............. | G06F 15/7821 |
| 2020/0167296 A1* | 5/2020 | Kim | ............. | G06F 30/392 |

OTHER PUBLICATIONS

Singh, Jasmeet et al., "High metal density and low latency bus implementation on 17 metal stack 7ff technology," SNUG India—Bangalore, Jun. 26, 2019, pp. 1-25.

* cited by examiner

FIG. 16

METAL TRACK ROUTING WITH BUFFER BANK INSERTION

TECHNICAL FIELD

Examples of the present disclosure generally relate to metal track routing for a hardware design of an integrated circuit (IC) with buffer bank insertion.

BACKGROUND

In integrated circuit design, place and route by electronic design automation (EDA) tools has become standard practice due to the complexity of the integrated circuits. Place and route is a stage in the design of integrated circuits that is composed of two steps, placement and routing. The first step, placement, involves determining where to place all intellectual property (IP) hardblocks, electronic components, circuitry, and logic elements in a layout. This is followed by routing, which determines the design of all the metal lines or tracks and vias needed to connect the placed components. Place and route by an EDA tool can significantly reduce manual efforts in designing the hardware of the integrated circuit.

SUMMARY

Examples described herein provide for a technique for metal track routing with buffer bank insertion in a representation of a hardware design of an integrated circuit. Utilization of some metal layers in the designed chip can increase, as well as speed of signals along the routed metal tracks.

An example of the present disclosure is a method for routing in a hardware design. The method uses a processor-based system. Pins of ports of hardblocks placed in a representation of a placed layout are identified. Logical tracks for nets associated with the pins of the ports are generated. Each of the logical tracks is assigned to a metal layer of a plurality of metal layers. Logical tracks and corresponding nets are grouped into respective groups. One or more buffer banks is inserted into the placed layout. Each of the one or more buffer banks is for one of the groups of logical tracks and divides each logical track and corresponding net of the one of the groups of logical tracks. Each of the one or more buffer banks has pins associated with the respective divided nets. Each of the pins of the one or more buffer banks is assigned to a middle or higher metal layer of the plurality of metal layers. Metal tracks are generated in a representation of a hardware layout based on the logical tracks, the pins of the ports, and the pins of the one or more buffer banks.

Another example of the present disclosure is a hardware design system. The hardware design system includes a hardware platform including a central processing unit (CPU) and a memory, and a hardware design tool including instructions stored on the memory and executable by the CPU in the hardware platform. The hardware design tool is configured to identify pins of ports of hardblocks placed in a representation of a placed layout; generate logical tracks for nets associated with the pins of the ports, each of the logical tracks being assigned to a metal layer of a plurality of metal layers; group logical tracks and corresponding nets into respective groups; and insert one or more buffer banks into the placed layout. Each of the one or more buffer banks is for one of the groups of logical tracks and divides each logical track and corresponding net of the one of the groups of logical tracks. Each of the one or more buffer banks has pins associated with the respective divided nets. Each of the pins of the one or more buffer banks is assigned to a middle or higher metal layer of the plurality of metal layers. The hardware design tool is configured to generate metal tracks in a representation of a hardware layout based on the logical tracks, the pins of the ports, and the pins of the one or more buffer banks.

A further example of the present disclosure is a method for routing in a hardware design. The method uses a processor-based system. Pins of ports of hardblocks placed in a representation of a placed layout are identified. Each of the pins of the ports is assigned to a metal layer of a plurality of metal layers. Logical tracks for nets associated with the pins of the ports are generated. Each of the logical tracks is assigned to a highest metal layer of the plurality of metal layers to which a pin associated with the corresponding net is assigned. Logical tracks assigned to multiple metal layers of the plurality of layers and corresponding nets into respective groups are grouped. A type of buffer bank selected from a plurality of types of buffer banks is assigned to one or more of the groups of logical tracks. The type of buffer bank is selected based on directionality of signals of logical tracks of the respective group of logical tracks. A buffer bank corresponding to the type of buffer bank is inserted into the placed layout for respective ones of the one or more of the groups of logical tracks. Each inserted buffer bank divides each logical track and corresponding net of the respective group of logical tracks. Each inserted buffer bank has pins associated with the respective divided nets. Each of the pins of the one or more buffer banks is assigned to a middle or higher metal layer of the plurality of metal layers. Metal tracks are generated in a representation of a hardware layout based on the logical tracks, the pins of the ports, and the pins of the one or more buffer banks.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 16 shows a cross-section of logical tracks assigned to respective metal layers and arranged according to the bus plan according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
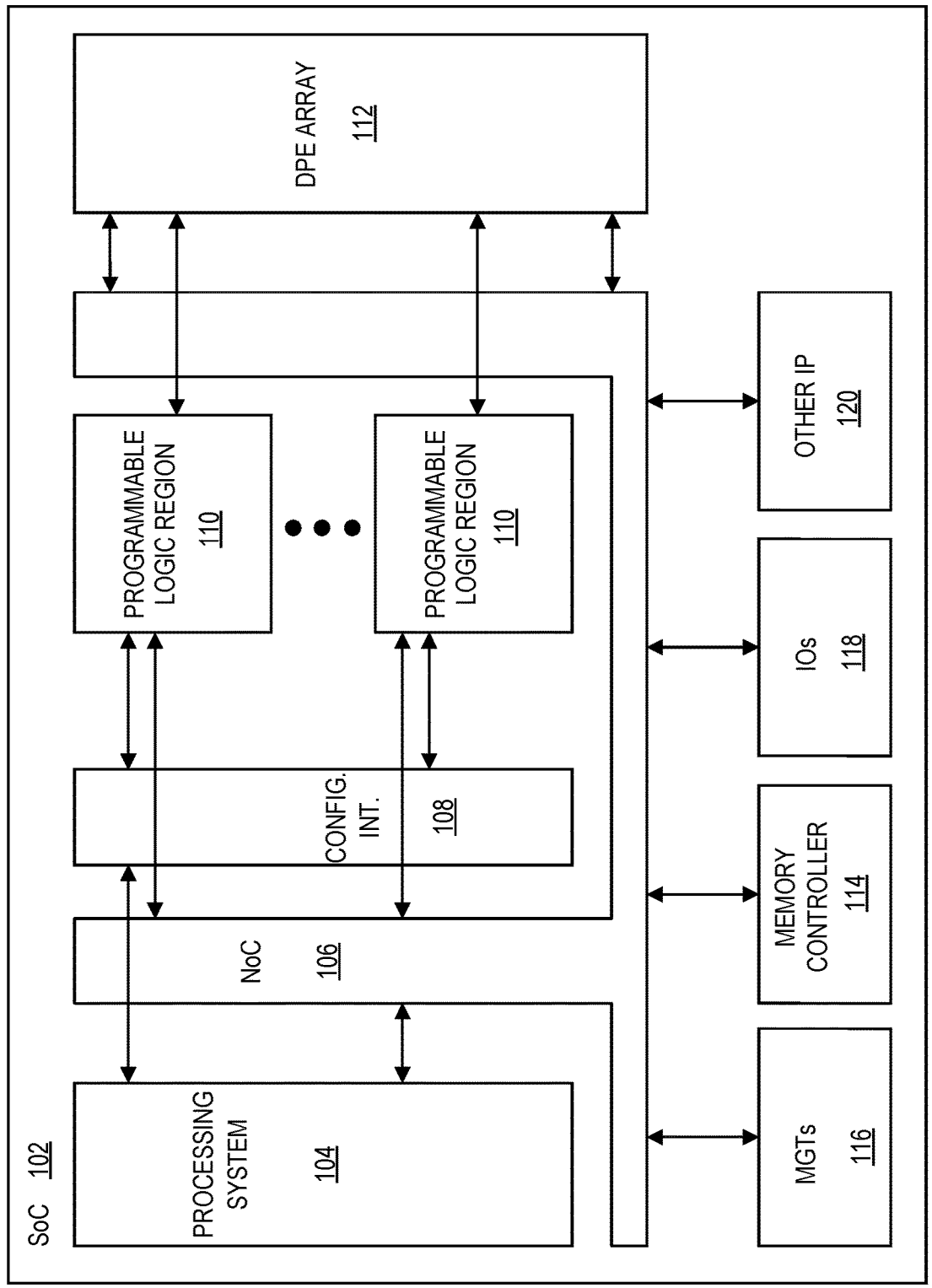
FIG. 1 is a block diagram depicting a system-on-chip (SoC), which may include metal tracks routed as described herein according to some examples.

Examples described herein provide for a technique for metal track routing with buffer bank insertion in a representation of a hardware design of an integrated circuit. Various aspect described herein insert structured buffer banks with routing in lower metal layers constrained to a layout of the respective buffer bank. Pins for the buffer banks can be at a higher metal layer, which can direct routing of metal tracks to the buffer banks to be at or above that higher metal layer. Some aspects described herein implement a pin plan that identifies connections to intellectual property (IP) hardblocks at designated metal layers, which can also direct routing of metal tracks at or above those metal layers. Other aspects can implement a track and metal layer awareness for connecting ports of IP hardblocks and buffer banks in a structured order. Utilization of some metal layers in the designed chip can increase, as well as speed of signals along the routed metal tracks.

Techniques and processor-based systems (e.g., electronic design automation (EDA) tools) for generating representations of circuits, including placing IP hardblocks and routing metal tracks, have been implemented previously. However, previous techniques resulted in low utilization of metal layers in a designed circuit. This resulted in an increased size of a chip on which the circuit was formed to accommodate routing of the metal tracks on the chip. Additionally, the increase in size increased the cost to fabricate the chip, including an increase in materials cost. Accordingly, a technical problem existed in that routing of metal tracks for a circuit resulted in low metal layer utilization, which increased a size and cost of a chip. Various examples provide solutions to these problems by implementing one or more of: (1) insertion of buffer banks with pins at higher metal layers, (2) pin planning that can result in metal tracks being routed in higher metal layers, and/or (3) a track and layer aware routing of metal tracks. Various techniques and processor-based systems can implement any of these aspects. Accordingly, techniques and processor-based systems described herein can overcome these technical problems and realize representations of circuits that have higher metal layer utilization, which can decrease the size of a chip and cost to fabricate the chip.

Aspects of these and other examples are described below. Additional or other benefits may be achieved by various examples, as a person having ordinary skill in the art will readily understand upon reading this disclosure.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Even further, various directions or orientations are described as, e.g., vertical and horizontal. These designations are for ease of description of generally perpendicular directions or orientations, and other directions or orientations may be implemented.

Figure 2:
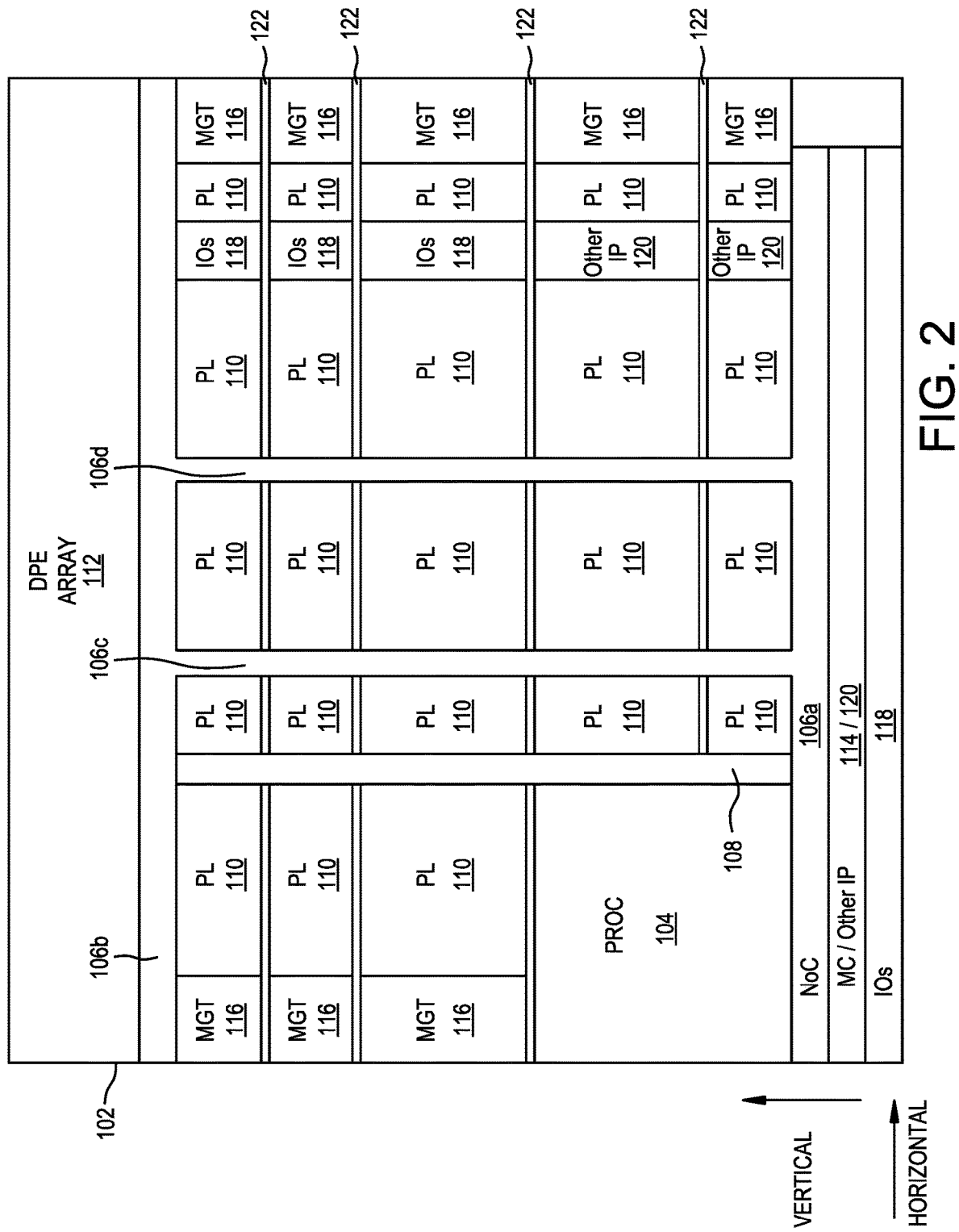
FIG. 2 is a layout of the SoC of FIG. 1 according to some examples.

FIGS. 1 and 2 are provided as an example architecture in which routing according to some examples can be implemented. Routing and other aspects described herein can be applied to any integrated circuit (IC), whether a programmable IC (like a field programmable gate array (FPGA)), a hardwired application specific IC (ASIC), or an IC therebetween. Further, the routing is described in the context of routing for a network-on-chip (NoC) as an example. Routing and other aspects described herein can be applied to any interconnect or metal layer(s) routing.

FIG. 1 is a block diagram depicting a system-on-chip (SoC) 102, which may include metal tracks routed as described herein according to some examples. The SoC 102 is an IC that is a programmable logic device, such as a FPGA. The SoC 102 comprises a processing system 104, a NoC 106, a configuration interconnect 108, one or more programmable logic regions 110, a data processing engine (DPE) array 112, a memory controller 114, multi-gigabit transceivers (MGTs) 116, input/output blocks (IOs) 118, and other IP circuits 120.

In general, the processing system 104 is connected to the programmable logic region(s) 110 through the configuration interconnect 108. The processing system 104, programmable logic region(s) 110, DPE array 112, memory controller 114, MGTs 116, IOs 118, and other IP circuits 120 are also connected to the a programmable network of the NoC 106, and hence, may be communicatively coupled to each other via the programmable network of the NoC 106. The DPE array 112 is connected (e.g., directly) to one or more of the programmable logic regions 110. The processing system 104, memory controller 114, MGTs 116, IOs 118, and other IP circuits 120 can also be connected (e.g., directly) to one or more of the programmable logic region(s) 110. Additionally, the memory controller 114 can be connected to at least one of the IOs 118, which can be in turn connected to external memory (not illustrated), and hence, the memory controller 114 can be communicatively coupled to external memory. At least some of the IOs 118 may be communicatively coupled to the NoC 106 through the memory controller 114.

The processing system 104 can include one or more processor cores. For example, the processing system 104 can include a number of ARM-based embedded processor cores. The programmable logic region(s) 110 can include any number and combination of columns of digital signal processing (DSP) blocks, random access memory blocks (BRAMs), UltraRAM blocks (URAMs), configurable logic blocks (CLBs) (e.g. LUTs), and programmable interconnect elements (INTs). A column of programmable interconnect elements is generally disposed between neighboring columns of other logic blocks. The programmable logic region(s) 110 may be programmed or configured using the processing system 104 through the configuration interconnect 108. For example, the configuration interconnect 108 can enable, for example, frame-based programming of the fabric of the programmable logic region(s) 110 by a processor core of the processing system 104 (such as a platform management controller (PMC)).

The DPE array include an interface block and DPEs arranged in an array. The interface block includes tiles, and each tile includes interface circuits that are coupled or connected (e.g., directly) to, for example, the programmable logic regions 110 and/or programmable network of the NoC 106. Each tile further includes a streaming switch and a memory mapped switch. Streaming switches of neighboring tiles of the interface block are connected to each other. Each DPE includes a core and a memory module. The core is a hardened processor core and can include program memory for storing instruction code that is executed by the processor core. The memory module includes memory banks and a direct memory access (DMA) engine. The core is connected (e.g., directly connected) to memory modules in its DPE and in neighboring DPE and is configured to and capable of communicating with cores of neighboring DPEs by shared memory communications. Each DPE further includes a streaming switch and a memory mapped switch. The streaming switches in neighboring DPEs and tiles of the interface block are connected and form a streaming network. A core in any DPE can communicate with a core of another DPE and/or with a circuit outside of the DPE array (e.g., the programmable logic region 110) via the streaming network (e.g., via DMA reads and/or writes to memory in a memory module via the DMA engine of that memory module). The memory mapped switches of the tiles of the interface block and DPEs are connected along a direction away or perpendicular to the interface block. The tiles and DPEs can include configuration registers that are configured to and capable of configuring the stream switches and other programmable components of the tiles and DPEs. Configuring the stream switches can configure routes of data streams in the streaming network. The program memory, memory modules, and/or configuration registers can be written or read with appropriate program code instructions, application data, and/or configuration and/or control data via the memory mapped network.

The NoC 106 generally includes a programmable routing network and a NoC peripheral interconnect (NPI). The programmable network provides routing of NoC packets between different systems or circuits. The programmable network includes NoC packet switches interconnected by line segments, which are between NoC master units (NMUs) and NoC slave units (NSUs). Each NMU is an ingress circuit that connects a master circuit to the NoC 106. Each NSU is an egress circuit that connects the NoC 106 to a slave endpoint circuit. Each NoC packet switch performs switching of NoC packets. Hence, the NMUs, NoC packet switches, and NSUs can be configured to provide a channel for communications between a master endpoint circuit to a slave endpoint circuit via an NMU, NoC packet switches interconnected by line segments, and an NSU. The NMUs, NoC packet switches, and NSUs also include register blocks, which are written to configure the respective NMU, NoC packet switch, and NSU. The register blocks can be written via the NPI. For example, a PMC can transmit memory mapped write requests to the NMUs, NoC packet switches, and NSUs via the NPI to write to the register blocks to configure the NMUs, NoC packet switches, and NSUs. The NPI can include interconnected NPI switches that can route the memory mapped write requests to the appropriate register block.

External memory can be off-chip from the SoC 102, and in other examples, memory can be in the SoC 102. External memory can be any memory, such as static random access memory (SRAM), dynamic random access memory (DRAM) like double data rate synchronous DRAM (DDR SDRAM), or other memory. The IOs 118 can be any input/output circuit to communicatively couple the SoC 102 with other circuits and/or systems. In some examples, the IOs 118 can include high density input/output (HDIO) circuits, peripheral component interconnect express (PCIe) circuits, eXtreme Performance Input/Output (XPIO) circuits, and/or the like. The other IP circuits 120 can be, for example, digital clock managers, analog-to-digital converters, system monitoring logic, and/or any circuit for a given implementation. In some examples, at least some of the memory controller 114, MGTs 116, IOs 118, and/or other IP circuits 120 are configurable. For example, the memory controller 114, MGTs 116, IOs 118, and/or other IP circuits 120 can be configurable via the NPI of the NoC 106.

FIG. 2 illustrates a layout of the SoC 102 of FIG. 1 according to some examples. Horizontal and vertical directions are illustrated for simplicity of reference. The layout of FIG. 2 generally has five programmable logic regions 110, which will be described further below.

The NoC 106 has a lower horizontal NoC portion 106a, an upper horizontal NoC portion 106b, and two vertical NoC portions 106c, 106d. A memory controller 114 and some other IP circuits 120 may be disposed in the area of the lower horizontal NoC portion 106a. As illustrated, the memory controller 114 and other IP circuits 120 are disposed in an area vertically below the lower horizontal NoC portion 106a. IOs 118 are disposed along a bottom edge of the layout and between the lower horizontal NoC portion 106a and the bottom edge of the layout. The upper horizontal NoC portion 106b is disposed generally between the programmable logic regions 110 and the DPE array 112. The processing system 104 is along a first lateral edge of the layout and along the lower horizontal NoC portion 106a. MGTs 116 are along the first lateral edge of the layout extending from the processing system 104 to the upper horizontal NoC portion 106b. MGTs 116 are also along a second lateral edge (opposite from the first lateral edge) of the layout extending from the lower horizontal NoC portion 106a to the upper horizontal NoC portion 106b. The configuration interconnect 108 extends along a side of the processing system 104 and from the lower horizontal NoC portion 106a to the upper horizontal NoC portion 106b. A column of IOs 118 and other IP circuits 120 is proximate the MGTs 116 along the second lateral edge and extend from the lower horizontal NoC portion 106a to the upper horizontal NoC portion 106b. Rows 122 of clock and other control logic extend horizontally across the layout. The rows 122 are used to distribute the clock and other control signals across the breadth of the SoC 102.

A first one of the programmable logic regions 110 is in the area between the processing system 104 and the upper horizontal NoC portion 106b and between the configuration interconnect 108 and the MGTs 116 along the first lateral edge of the layout. A second one of the programmable logic regions 110 is in the area between the lower horizontal NoC portion 106a and the upper horizontal NoC portion 106b and between the configuration interconnect 108 and the vertical NoC portion 106c. A third one of the programmable logic regions 110 is in the area between the lower horizontal NoC portion 106a and the upper horizontal NoC portion 106b and between the vertical NoC portions 106c, 106d. A fourth one of the programmable logic regions 110 is in the area between the lower horizontal NoC portion 106a and the upper horizontal NoC portion 106b and between the vertical NoC portion 106d and the column of IOs 118 and other IP circuits 120. A fifth one of the programmable logic regions 110 is in the area between the lower horizontal NoC portion 106a and the upper horizontal NoC portion 106b and between the column of IOs 118 and other IP circuits 120 and the MGTs 116 along the second lateral edge of the layout.

The layout of FIG. 2 illustrates a constrained area in which the layout of IP hardblocks (e.g., NPSs) of the NoC 106 are to be placed and routed. For example, the area of the horizontal NoC portions 106a, 106b and vertical NoC portions 106c, 106d is the area in which metal tracks are routed in some examples. In some examples, NMUs and NSUs of the programmable network of the NoC 106 are located at locations determined by the IP hardblock to which those NMUs and NSUs interface. The NPSs can then be periodically instantiated throughout the area of the NoC 106. Various examples describe aspects of routing metal tracks and/or instantiating buffer banks to interconnect, e.g., the NMUs, NSUs, and NPSs.

Some examples described herein attempt to utilize upper metal layers more. In a 7 nm technology node, 17 metal layers may be present in a chip. Generally metal tracks in lower metal layers have a decreased thickness and width compared to metal tracks in upper metal layers. This results in a lower cross-section area of metal tracks, and a corresponding higher resistance, in lower metal layers compared to metal tracks in upper metal layers. The higher resistance can result in an increased resistance-capacitance (RC) time delay, which can cause signals to propagate with a greater delay on lower metal layers compared to upper metal layers. With a Gigahertz (GHz) frequency design and with signals spanning tens of millimeters (mm) across a chip, delay in signal propagation can be detrimental to a chip design. Hence, some examples herein attempt to cause metal tracks to be routed more in higher metal layers and to increase utilization of upper metal layers. For example, in the 7 nm technology node, examples can attempt to increase routing of metal tracks in the M11 through M15 metal layers. In these metal layers, the resistance of a metal track is six times less than resistance of a metal track in lowest metal layer, e.g., a M0 or M1 metal layer. As technology evolves, the various metal layers to which metal tracks are routed by examples can also evolve and change based on the technology node.

Figure 3:
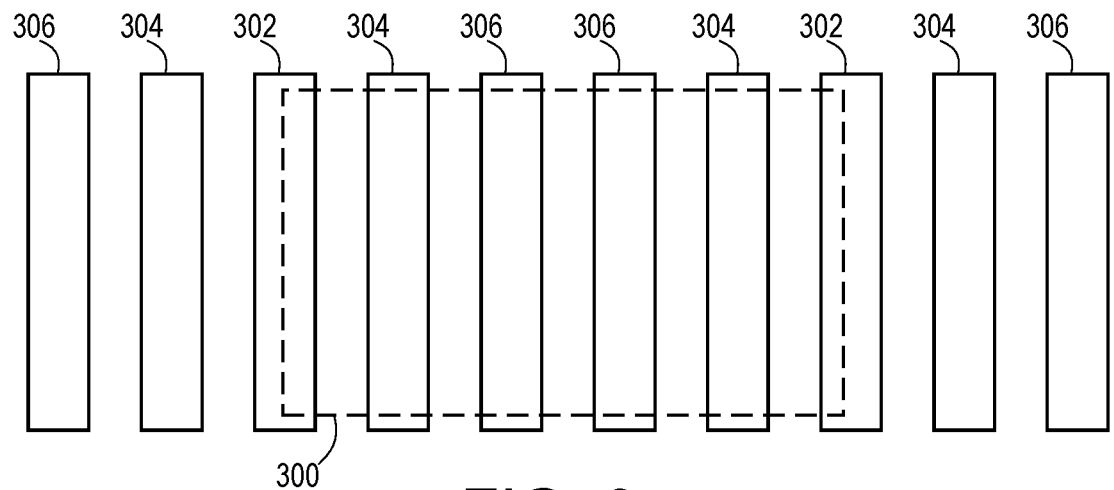
FIG. 3 is an example pattern of a layout of a structured bus that may be implemented in a metal layer of a chip according to some examples.

In some examples, structured buses can be instantiated to interconnect the IP hardblocks (e.g., NMUs, NSUs, and NPSs). The structured buses can include interleaved power and/or ground metal tracks to shield signal metal tracks. FIG. 3 illustrates an example pattern 300 of a layout of a structured bus that may be implemented in a metal layer of a chip. The pattern 300 includes power/ground node metal tracks 302 that form at least part of a power/ground network. The power/ground node metal tracks 302 may alternatingly be, in a direction across the layout, a power node and a ground node of the chip. Between each neighboring pair of power/ground node metal tracks 302 is a pair of half-shielded signal node metal tracks 304, with each of the half-shielded signal node metal tracks 304 neighboring a respective one of the power/ground node metal tracks 302. The layout also includes a number of unshielded signal node metal tracks 306 disposed between neighboring pairs of the power/ground node metal tracks 302 and neighboring pairs of the half-shielded signal node metal tracks 304. In the illustration of FIG. 3, two unshielded signal node metal tracks 306 are disposed between a neighboring pair of the half-shielded signal node metal tracks 304. In other examples, other numbers of the unshielded signal node metal tracks 306 may disposed between a neighboring pair of the half-shielded signal node metal tracks 304.

Interleaving the power/ground node metal tracks 302 permits at least half-shielding of some signal node metal lines. Signal node metal tracks (e.g., half-shielded signal node metal tracks 304) adjacent to a power/ground node metal track 302 can be shielded from the side of the power/ground node metal track 302. Signal node metal lines (e.g., unshielded signal node metal tracks 306) not adjacent to a power/ground node metal track 302 may have less or no shielding. Signals transmitted on half-shielded signal node metal tracks 304 can propagate faster and with reduced parasitic voltage drop than signals transmitted on unshielded signal node metal tracks 306.

Figure 4:
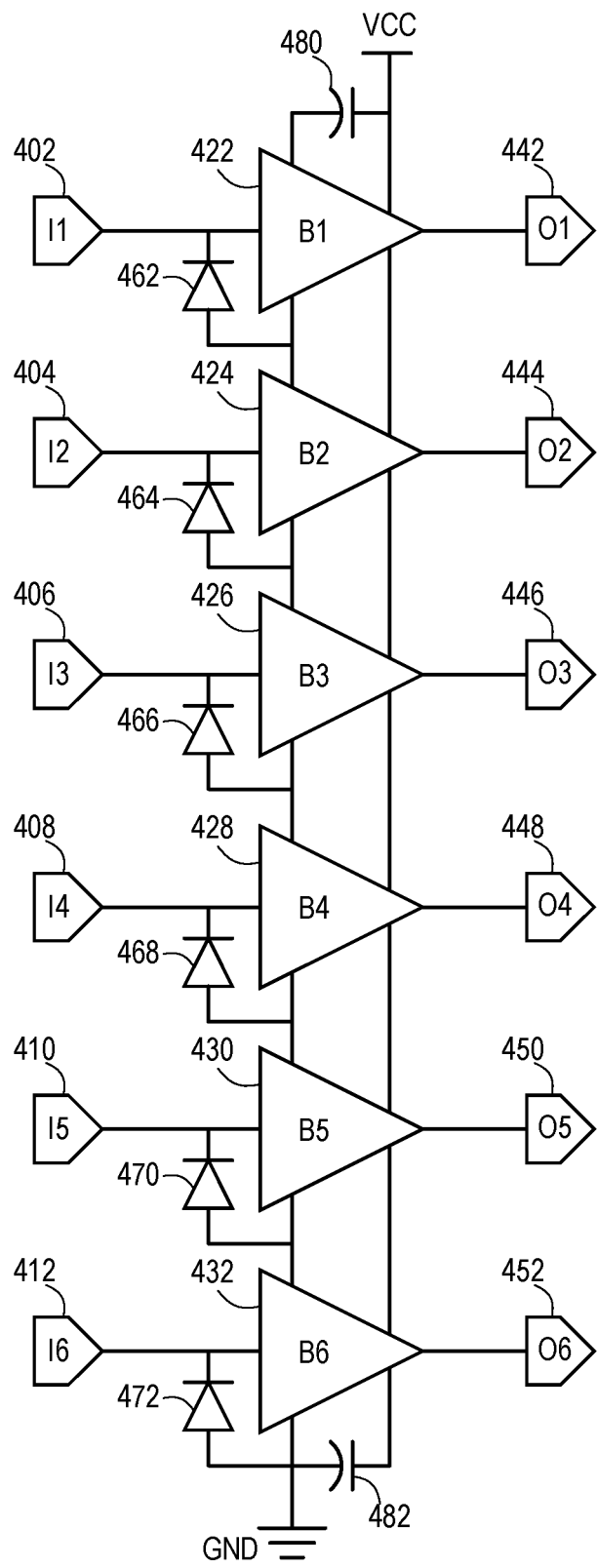
FIG. 4 is a circuit diagram of a buffer bank according to some examples.

Some examples instantiate one or more buffer banks along a bus length. FIG. 4 illustrates a circuit diagram of a buffer bank according to some examples. The buffer bank has a first input pin (I1) 402, second input pin (I2) 404, third input pin (I3) 406, fourth input pin (I4) 408, fifth input pin (I5) 410, and sixth input pin (I6) 412. The buffer bank includes a first buffer (B1) 422, second buffer (B2) 424, third buffer (B3) 426, fourth buffer (B4) 428, fifth buffer (B5) 430, and sixth buffer (B6) 432. The input nodes of the buffers B1-B6 422-432 are connected to respective ones of the input pins I1-I6 402-412. The buffer bank has a first output pin (O1) 442, second output pin (O2) 444, third output pin (O3) 446, fourth output pin (O4) 448, fifth output pin (O5) 450, and sixth output pin (O6) 452. The output nodes of the buffers B1-B6 422-432 are connected to respective ones of the output pins O1-O6 442-452. Power nodes and ground nodes of the buffers B1-B6 422-432 are connected to a power node VCC and a ground node GND, respectively. The buffer bank also includes diodes 462, 464, 466, 468, 470, 472. Each of the diodes 462-472 has a cathode connected to an input node of a respective buffer B1-B6 422-432 and has an anode connected to the ground node GND. The diodes 462-472 can act as capacitors to filter out noise in a signal input to each of the buffers B1-B6 422-432, for example. The buffer bank further includes capacitors 480, 482, each connected between the power node VCC and the ground node GND.

FIGS. 5 through 8 illustrate example cell pin layouts for buffer banks according to some examples. In these examples, a pair of buffers is illustrated in each cell pin layout to illustrate directionality of signals and connectivity of buffers generally. The examples are to generally show example arrangements of input pins and output pins, and other arrangements are contemplated in other examples. Various orientations described herein are for convenience of description.

Figure 5:
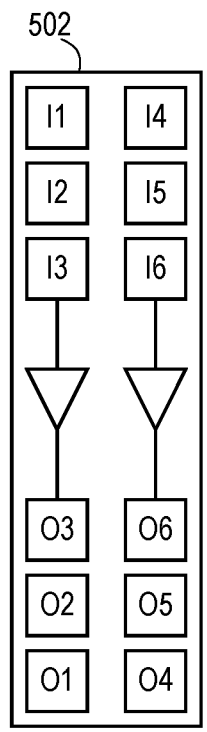
FIG. 5 is a uni-directional pass through cell pin layout according to some examples.

FIG. 5 illustrates a uni-directional pass through cell pin layout 502. The input pins I1-I3 are in a column in a northwest quadrant of the cell pin layout 502. The output pins O1-O3 are in a column (e.g., aligned with the column of the northwest quadrant) in a southwest quadrant of the cell pin layout 502. Signals pass from north to south via the respective corresponding input pin I1-I3, buffer B1-B3, and output pin O1-O3. The input pins I4-I6 are in a column in a northeast quadrant of the cell pin layout 502. The output pins O4-O6 are in a column (e.g., aligned with the column of the northeast quadrant) in a southeast quadrant of the cell pin layout 502. Signals pass from north to south via the respective corresponding input pin I4-I6, buffer B4-B6, and output pin O4-O6.

Figure 6:
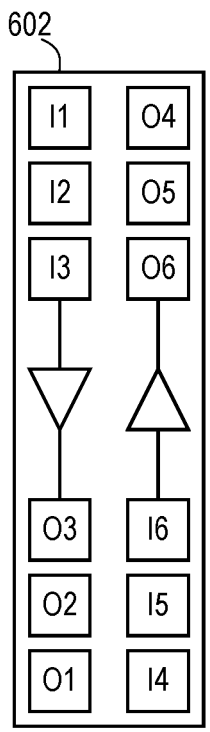
FIG. 6 is a bi-directional pass through cell pin layout according to some examples.

FIG. 6 illustrates a bi-directional pass through cell pin layout 602. The input pins I1-I3 are in a column in a northwest quadrant of the cell pin layout 602. The output pins O1-O3 are in a column (e.g., aligned with the column of the northwest quadrant) in a southwest quadrant of the cell pin layout 602. Signals pass from north to south via the respective corresponding input pin I1-I3, buffer B1-B3, and output pin O1-O3. The output pins O4-O6 are in a column in a northeast quadrant of the cell pin layout 602. The input pins I4-I6 are in a column (e.g., aligned with the column of the northeast quadrant) in a southeast quadrant of the cell pin layout 602. Signals pass from south to north via the respective corresponding input pin I4-I6, buffer B4-B6, and output pin O4-O6.

Figure 7:
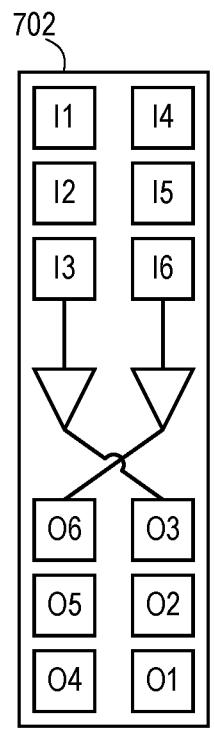
FIG. 7 is a uni-directional cross-over cell pin layout according to some examples.

FIG. 7 illustrates a uni-directional cross-over cell pin layout 702. The input pins I1-I3 are in a column in a northwest quadrant of the cell pin layout 702. The output pins O1-O3 are in a column in a southeast quadrant of the cell pin layout 702. Signals pass from north to south via the respective corresponding input pin I1-I3, buffer B1-B3, and output pin O1-O3. The input pins I4-I6 are in a column in a northeast quadrant of the cell pin layout 702. The output pins O4-O6 are in a column in a southwest quadrant of the cell pin layout 702. Signals pass from south to north via the respective corresponding input pin I4-I6, buffer B4-B6, and output pin O4-O6. The column of input pins I1-I3 in the northwest quadrant is aligned with the column of output pins O4-O6 in the southwest quadrant. The column of input pins I4-I6 in the northwest quadrant is aligned with the column of output pins O1-O3 in the southwest quadrant.

Figure 8:
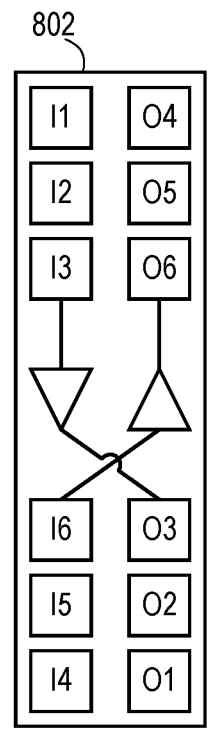
FIG. 8 is a bi-directional cross-over cell pin layout according to some examples.

FIG. 8 illustrates a bi-directional cross-over cell pin layout 802. The input pins I1-I3 are in a column in a northwest quadrant of the cell pin layout 802. The output pins O1-O3 are in a column in a southeast quadrant of the cell pin layout 802. Signals pass from north to south via the respective corresponding input pin I1-I3, buffer B1-B3, and output pin O1-O3. The input pins I4-I6 are in a column in a southwest quadrant of the cell pin layout 802. The output pins O4-O6 are in a column in a northeast quadrant of the cell pin layout 802. Signals pass from south to north via the respective corresponding input pin I4-I6, buffer B4-B6, and output pin O4-O6. The column of input pins I1-I3 in the northwest quadrant is aligned with the column of input pins I4-I6 in the southwest quadrant. The column of output pins O4-O6 in the northeast quadrant is aligned with the column of output pins O1-O3 in the southeast quadrant.

Variations to the layouts of FIGS. 5 through 8 may be implemented. For example, signals may be passed in different combination of pass through and cross-over, and/or in different combinations of directionality.

Figure 9:
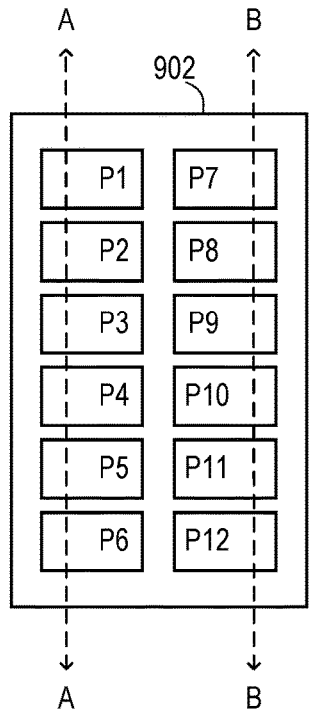
FIG. 9 is a generic cell pin layout at a metal layer of a chip according to some examples.

FIG. 9 illustrates a generic cell pin layout 902 at some metal layer of a chip according to some examples. The generic cell pin layout 902 has pins P1-P12. Each of the pins P1-P12 can be any of the input or output pins described in previous cell pin layouts or other layouts. The metal layer can be any layer. In some examples, the metal layer at which the pins P1-P12 are assigned is a metal layer having a resistance that is three times less than a lowest metal layer (e.g., the M0 or M1 metal layer) or less (e.g., six times less), and in some examples, is the M8 metal layer for a 7 nm technology node as described above.

Figure 10A:
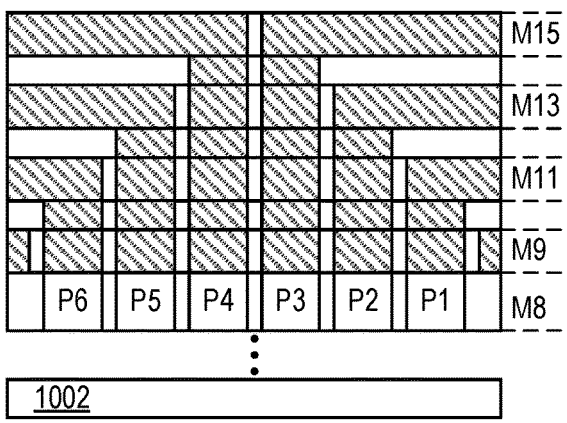
FIGS. 10A and 10B are cross-sectional views of metal layers above the generic cell pin layout of FIG. 9 according to some examples.
Figure 10B:
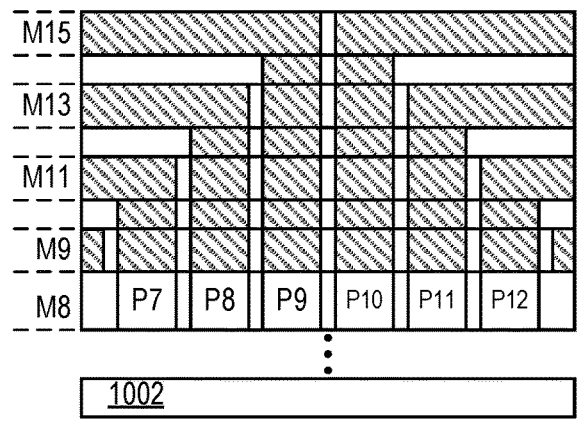

FIGS. 10A and 10B are cross-sectional views of metal layers above the generic cell pin layout 902 of FIG. 9. FIG. 10A is a cross-sectional view corresponding to cross-section A-A in FIG. 9, and FIG. 10B is a cross-sectional view corresponding to cross-section B-B in FIG. 9. FIGS. 10A and 10B show a semiconductor substrate 1002 (e.g., silicon) in and/or on which transistors of the buffers of a buffer bank are disposed. Metal layers are disposed on and above the semiconductor substrate. As illustrated, the pins P1-P12 are at the M8 metal layer, although the pins P1-P12 can be at other metal layers. Connections between the pins P1-P12 and appropriate sources or drains of transistors of buffers of the buffer bank in the semiconductor substrate 1002 can be routed through lower metal layers (e.g., M0-M7 metal layers) and constrained within the cell layout. As illustrated, pins P3, P4, P9, P10 can have escape routing from the cell layout in the M15 metal layer. Pins P2, P5, P8, P11 can have escape routing from the cell layout in the M13 metal layer. Pins P1, P6, P7, P12 can have escape routing from the cell layout in the M11 metal layer. Connections in intervening layers are between the M8 metal layer and the corresponding metal layer to escape routing. Although the various metal layers are shown for illustration and other metal layers may be used, by forming a cell pin layout at a given metal layer (such as the M8 metal layer), escape routing from pins can be pushed to a higher metal layer (e.g., the M11, M13, and M15 metal layers), which may have a lower resistivity than lower metal layers.

Figure 11:
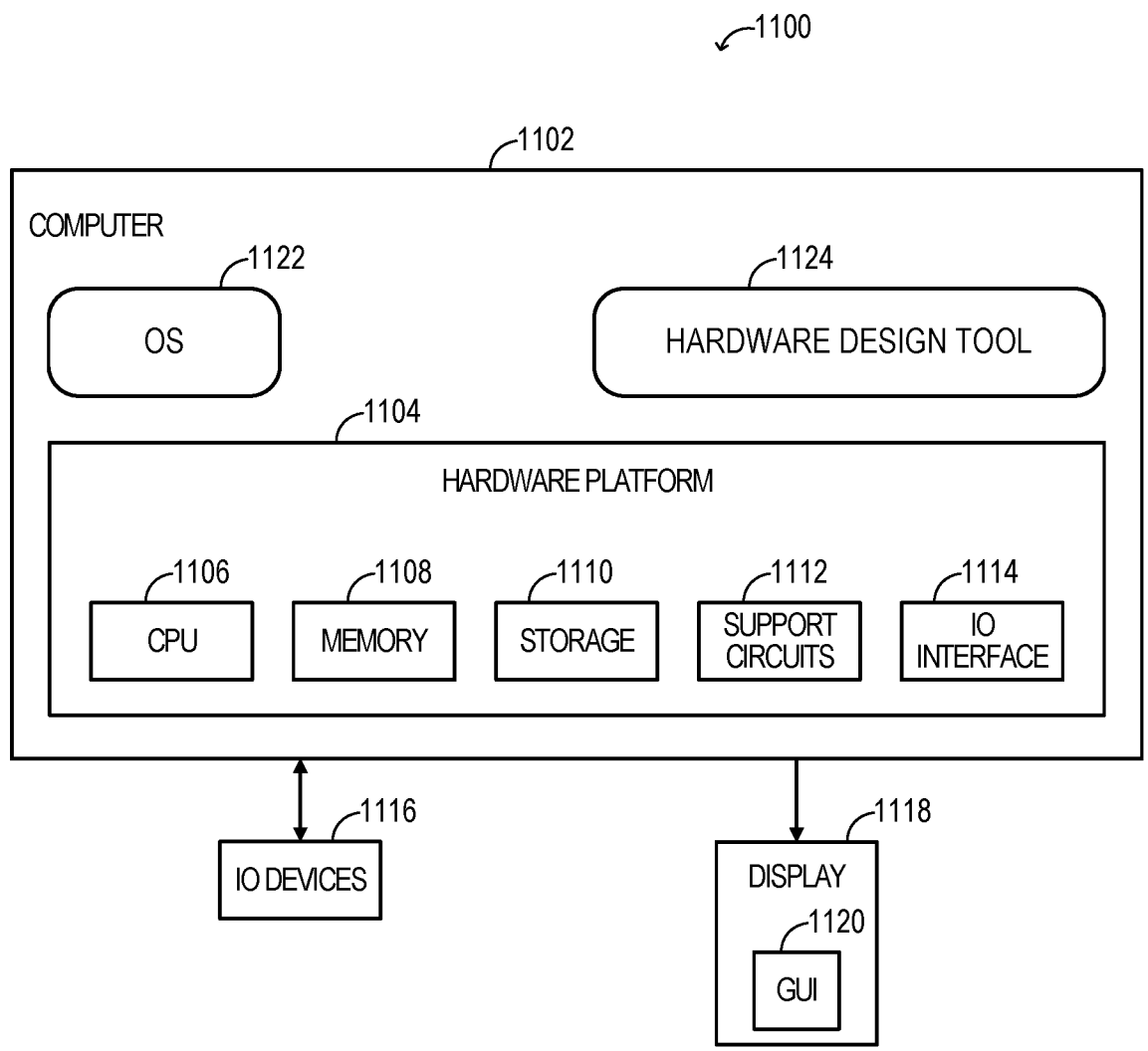
FIG. 11 is a block diagram depicting an example of a hardware design system in accordance with some examples.

FIG. 11 is a block diagram depicting an example of a hardware design system 1100, in accordance with some examples. The hardware design system 1100 (e.g., a processor-based system) can be used by a user to create a hardware layout of a circuit (e.g., an SoC) on a chip. For example, the hardware design system 1100 can instantiate buffer banks and route metal tracks in metal layers for a NoC, as indicated above. The hardware design system 1100 includes a computer 1102 coupled to input/output (IO) devices 1116 and a display 1118. The computer 1102 includes a hardware platform 1104 that can include components of a computing device, such as a central processing unit (CPU) 1106, system memory 1108, storage 1110, various support circuits 1112, and an IO interface 1114. The CPU 1106 can include one or more microprocessors. The CPU 1106 is configured to execute program instruction code that performs one or more operations described herein, such as the method of FIG. 13 described below. The program instruction code can be stored in system memory 1108, storage 1110, or any other memory in the hardware platform 1104 (e.g., cache memory). The system memory 1108 includes one or more non-transitory storage mediums that store information and can include, for example, RAM, ROM, or a combination thereof. The storage 1110 includes one or more local non-transitory storage mediums, such as hard disks, flash memory modules, solid state disks, optical disks, and the like. The storage 1110 can also include interface(s) configured for communication with one or more network data storage systems. The support circuits 1112 can include cache, power supplies, clock circuits, data registers, IO interfaces, and the like. The IO interface 1114 includes interfaces to/from the computer 1102. The IO interface 1114 can be coupled to the IO devices 1116, which can include a keyboard, mouse, and the like. The IO interface 1114 can also be coupled to the display 1118, which can present a graphical user interface (GUI) 1120 to a user.

The computer 1102 further includes a software platform comprising an operating system (OS) 1122 and a hardware design tool 1124. The OS 1122 and the hardware design tool 1124 include program instruction code that is executed by the CPU 1106, which program instruction code can be stored in system memory 1108, storage 1110, or any other memory. The OS 1122 can include any known operating system, such as Linux®, Microsoft Windows®, Mac OS®, and the like. The hardware design tool 1124 is an application that executes within the OS 1122, which provides an interface to the hardware platform 1104. Some operation of the hardware design tool 1124 is described below.

Figure 12:
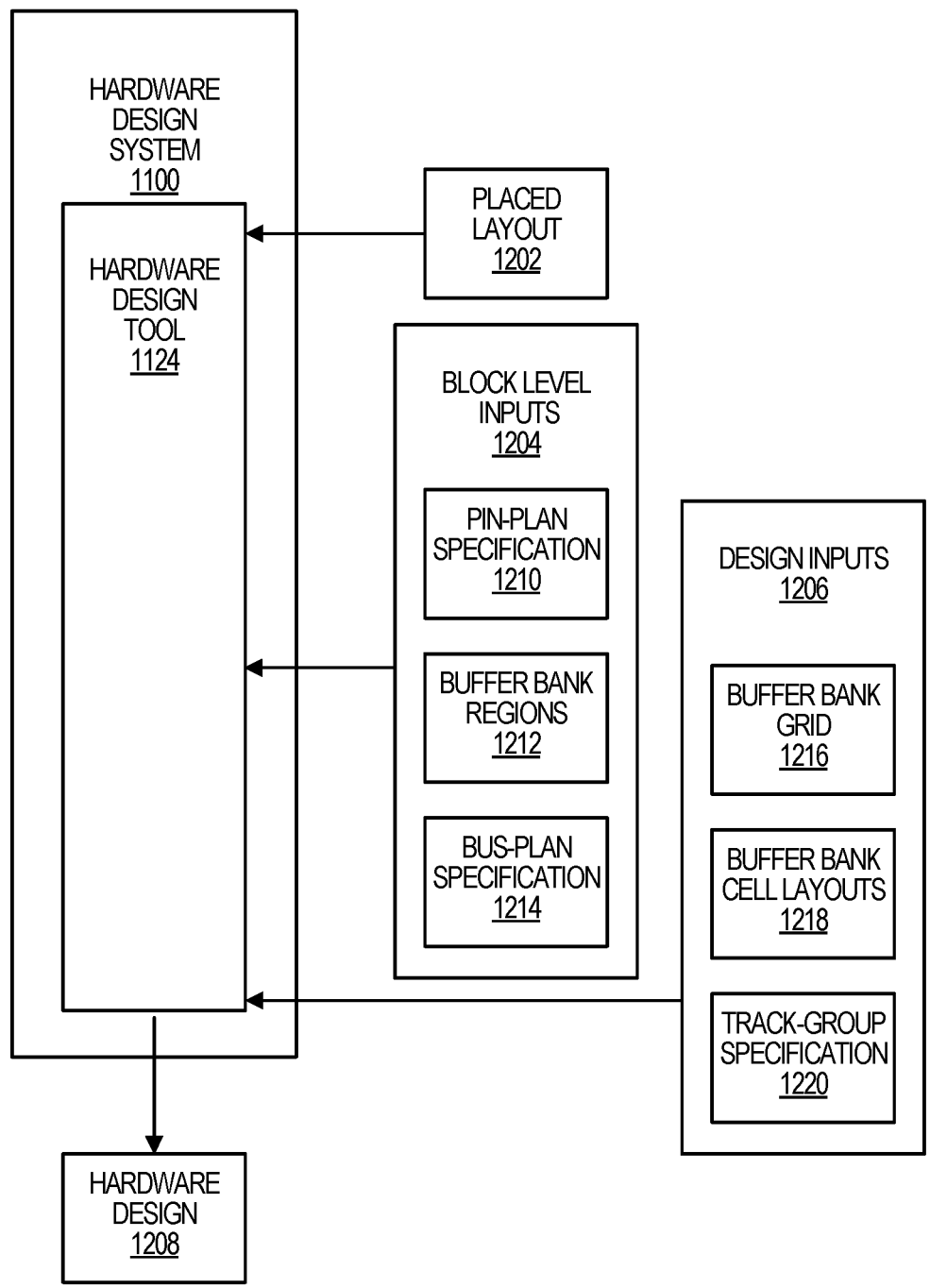
FIG. 12 depicts some aspects of the hardware design tool operating on the hardware design system according to some examples.

FIG. 12 illustrate some aspects of the hardware design tool 1124 operating on the hardware design system 1100 according to some examples. The hardware design tool 1124 receives as inputs a representation of a placed layout 1202, block level inputs 1204, and design inputs 1206, and outputs a representation of a hardware design 1208. The block level inputs 1204 include a pin-plan specification 1210, buffer bank regions 1212, and a bus-plan specification 1214. The block level inputs 1204 include a buffer bank grid 1216, buffer bank cell layouts 1218, and a track-group specification 1220.

The representation of a placed layout 1202 is, e.g., one or more files or other input that includes IP hardblocks as placed in a representation of a layout of a chip. The representation of the placed layout 1202 further can include a network of power/ground tracks placed in one or more metal layers. The network of power/ground tracks can be used for the structured buses described above with respect to FIG. 3. The representation of a placed layout 1202 can further include a netlist of nets that are to be routed between the IP hardblocks that are placed. The representation of the placed layout 1202 can be input to the hardware design tool 1124 or can be generated by the hardware design tool 1124, such as by a preceding placing operation(s).

The pin-plan specification 1210 is, e.g., one or more files or other input that can define which pins of a IP hardblock are for half-shielded metal tracks and which are pins of a IP hardblock are for unshielded metal tracks.

The buffer bank regions 1212 is, e.g., one or more files or other input that can define where buffer placement regions are placed in the representation of the placed layout 1202. The buffer placement regions can be placed within the region in which the routing occurs and outside or between IP hardblocks within the region in which the routing occurs. The buffer bank regions 1212 can be defined in and/or contemporaneously with the placement of IP hardblocks in the representation of the placed layout 1202 in some examples.

The bus-plan specification 1214 is, e.g., one or more files or other input that can explicitly define pins for any bus that does not align with any pins of another port of another bus. As described below, some buses can be aligned with another bus such that an assignment of logical tracks to metal layers can be an extension of the other bus. When a bus does not align with another bus, explicit definition of pins for that bus may need to be provided.

The buffer bank grid 1216 is, e.g., one or more files or other input that defines locations at which a buffer bank may be placed in a buffer placement region. The buffer bank grid 1216 identifies where buffer banks can be inserted according to appropriate design constraints. One grid of locations can be applicable to each buffer placement region, and/or different grids of locations can be applicable to different buffer placement regions.

The buffer bank cell layouts 1218 is, e.g., one or more files or other input that defines the permissible types of cell pin layouts of buffer banks that can be inserted. The different types of cell pin layouts can be any described above with respect to FIGS. 5 through 8 or any modification thereto. The pins of the cell pin layouts can be at a given metal layer, such as the M8 metal layer.

The track-group specification 1220 is, e.g., one or more files or other input that identifies which nets are to be assigned to what type of logical track in a structured bus. The track-group specification 1220 can identify which nets are half-shielded nets, for example.

The representation of a hardware design 1208 is, e.g., one or more files or other output that includes IP hardblocks and routing in metal layers between the IP hardblocks. Fabrication of chips can be based on the representation of the hardware design 1208, e.g., by creating photolithography masks and sequences of lithography, deposition, or the like.

Figure 13:
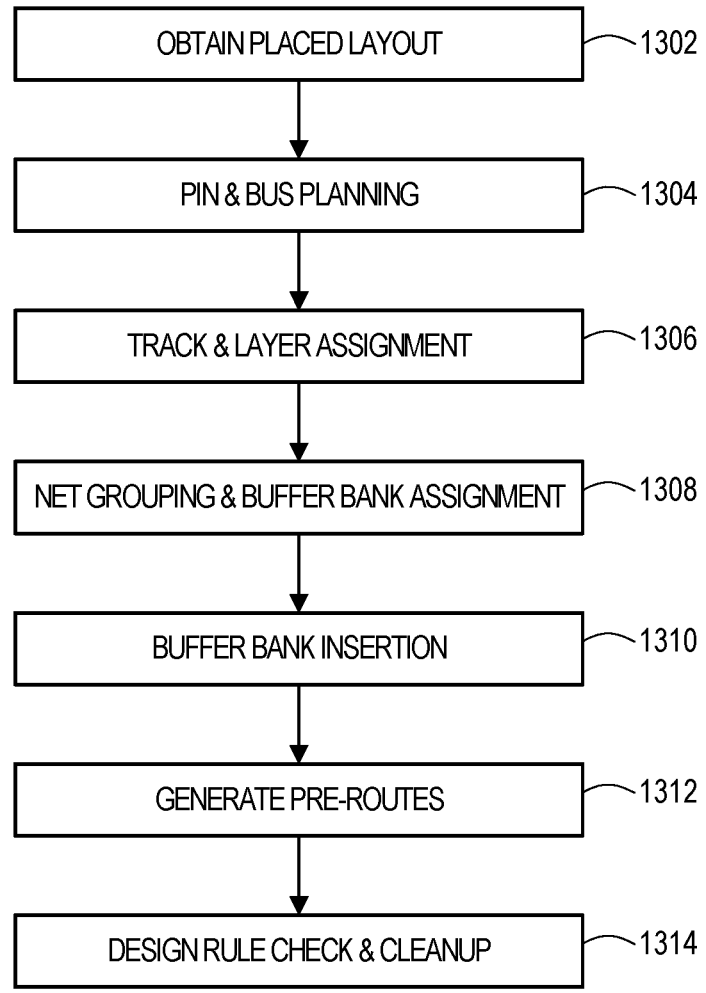
FIG. 13 is a flowchart of a method of generating a representation of a hardware design according to some examples.

FIG. 13 is a flowchart of a method of generating a representation of a hardware design according to some examples. Execution of program instruction code (which can be stored in a non-transitory storage medium) to execute the hardware design tool 1124 can cause the method of FIG. 13 to be performed.

Figure 14:
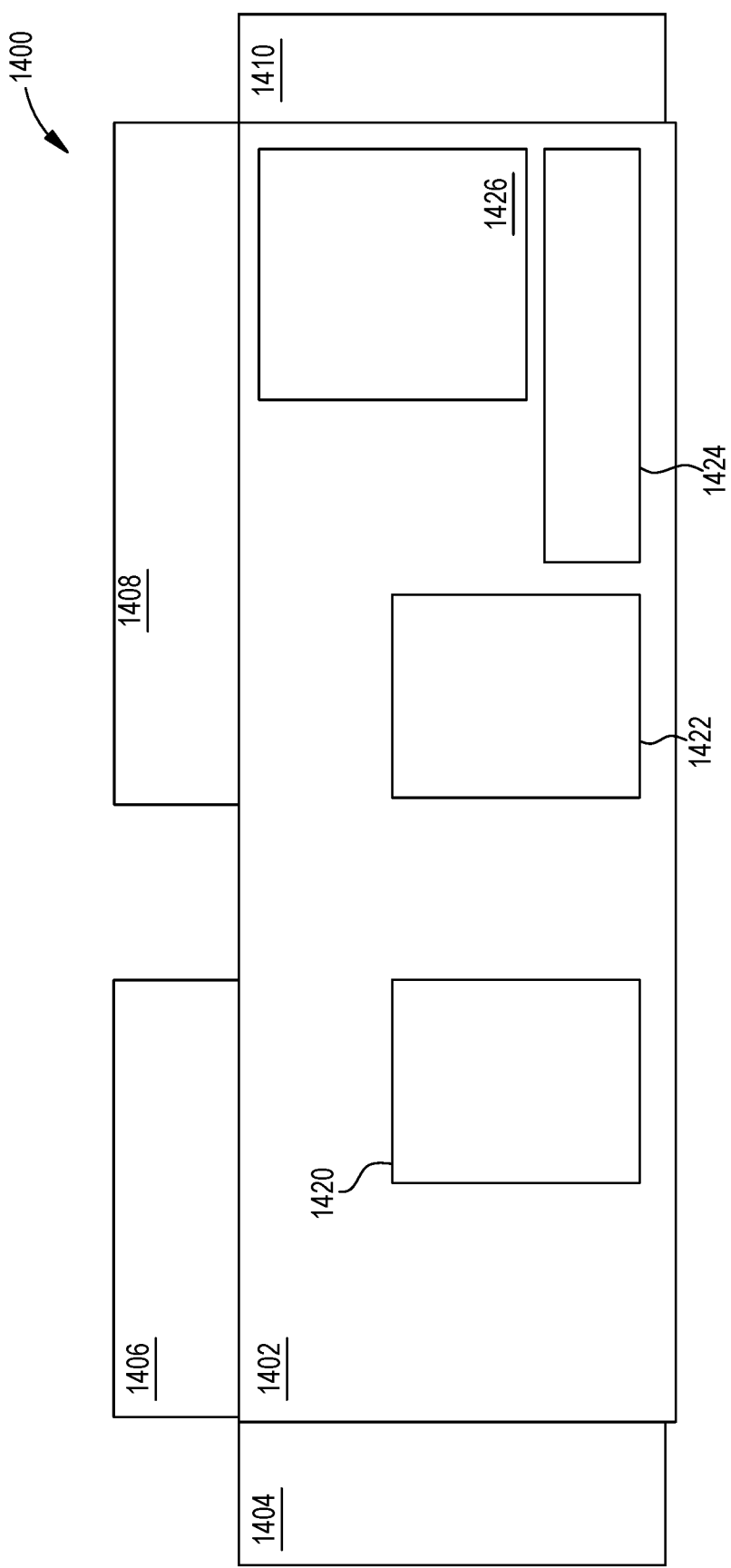
FIG. 14 depicts a simplified placed layout according to some examples.

At block 1302, a placed layout is obtained. The placed layout is a layout in which the various IP hardblocks of the integrated circuit are placed. FIG. 14 depicts a simplified placed layout 1400 for the purposes of illustrating an example. The placed layout 1400 includes a routing region 1402 (e.g., which can be any of horizontal NoC portions 106a, 106b, and/or vertical NoC portions 106c, 106d) and system IP hardblocks 1404, 1406, 1408, 1410. For example, the system IP blocks 1404-1410 can be or include any of the processing system 104, programmable logic regions 110, DPE array 112, memory controllers 114, IOs 118, or other IP circuits 120 illustrated in FIGS. 1 and 2. The routing region 1402 is the region in which routing for, e.g., the NoC 106 is to be routed. The routing region 1402 includes routing IP hardblocks 1420, 1422, 1424. The routing IP hardblocks 1420-1424 can be, e.g., NPSs to and from which routing of the NoC 106 is routed. Although not illustrated, the placed layout can also include power metal tracks and ground metal tracks, which can form a power/ground network for shielding signal metal tracks. In some examples, a representation of the placed layout can be a file input to the hardware design tool 1124. In some examples, a representation of the placed layout can be generated by the hardware design tool 1124 such as part as a placing operation(s) performed before routing of the method of FIG. 13.

At block 1304, pin and bus planning is performed. The hardware design tool 1124 can identify and/or insert pins in the placed layout. Pins can be derived from ports of IP hardblocks on the placed layout. For example, ports for the processing system 104, programmable logic regions 110, etc. can be designated at a given metal layer(s) within the respective IP hardblocks, and hence, pins for those ports at the metal layer(s) can be identified in the placed layout. Generally, ports for IP hardblocks outside of and interfacing with the routing region can have pins located at higher metal layers (e.g., M11 through M15 metal layers), which can be defined in the IP hardblocks. In some examples, these higher metal layers can have a resistance of a metal track that is six times less than resistance of a metal track in lowest metal layer, e.g., a M0 or M1 metal layer, or less resistance. Ports for routing IP hardblocks within the routing region can have pins located at an intermediate metal layer (e.g., M8 metal layer), which can also be defined in the routing IP hardblocks. In some examples, these intermediate metal layers can have a resistance of a metal track that is three times less than resistance of a metal track in lowest metal layer, e.g., a M0 or M1 metal layer, or less resistance. Pins derived from ports may be referred to as interface pins. Additionally, other pins can be added as desired in the placed layout to align various metal tracks. For example, if some IP hardblock is to access a metal layer at a given location, a pin may be added at that location in the metal layer. Such pins may be referred to as area pins.

The pins are generally placed so that various ports and buses align as much as practical. Each port can be associated with multiple nets, which may be provided in a netlist of the circuit that is being created. Each port generally will be associated with the same nets as another port. A bus is planned between the ports associated with the same nets. For each net of the multiple nets associated with a bus and corresponding ports, a pin can be inserted or identified at a port of one IP hardblock (e.g., as an output of the respective net), and another pin can be inserted or identified at a port of another IP hardblock (e.g., as an input of the respective net). If ports for different buses align, the pins for those ports of different buses can be placed where the buses align. Since each pin is placed at some intermediate or higher metal layer, some flexibility may be present to place the pin because routing in lower metal layers may route a net to a device on the semiconductor substrate (e.g., silicon). The various pins can determine points between which the hardware design tool 1124 will route metal tracks and locations where the router will not route some metal tracks to prevent short circuits or conflicts.

Figure 15:
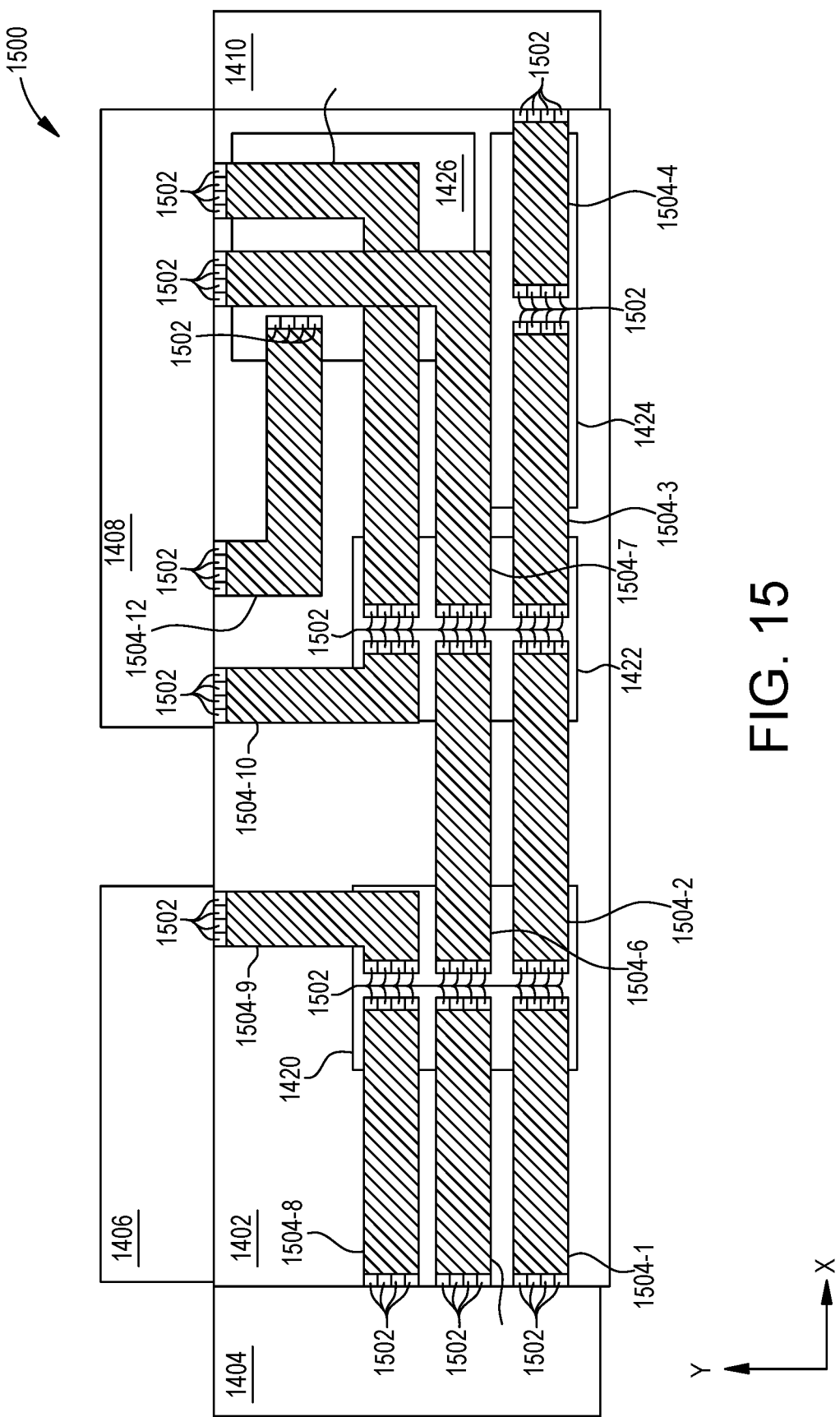
FIG. 15 depicts a simplified intermediate layout according to some examples.

FIG. 15 depicts a simplified intermediate layout 1500 for the purposes of illustrating an example. Each group of contiguous pins 1502 corresponds to a port in this example. Each port can include, e.g., hundreds of pins for a port. Each of the pins 1502 can be placed in a metal layer determined by the corresponding port of the IP hardblock. Buses 1504-1 through 1504-12 are logically created between corresponding ports. In the illustrated examples, the ports for buses 1504-1, 1504-2, 1504-3, 1504-4 generally align with each other along the X-direction, and hence, the pins for the ports for buses 1504-1 through 1504-4 are aligned along the X-direction so that the buses 1504-1 through 1504-4 are aligned. Similarly, ports for buses 1504-5, 1504-6, 1504-7 generally align with each other along the X-direction, and hence, the pins for ports for buses 1504-5 through 1504-7 are aligned along the X-direction so that the buses 1504-5 through 1504-7 are aligned. Bus 1504-7 has a port that interfaces with system IP hardblock 1408, which causes the bus 1504-7 to extend in a Y-direction that can align with pins of the port of the system IP hardblock 1408 that are more naturally or arbitrarily placed. Other buses are similarly aligned. In some examples, any bus that does not have ports that align with ports of another bus can have pins explicitly defined in, e.g., the bus-plan specification 1214. For example, bus 1504-12 can have pins explicitly defined in the bus-plan specification 1214.

Further, as a part of the bus planning, each bus may be attributed a plan of logical tracks for each metal layer of the bus. For example, each metal layer for each bus can be attributed an ordering of logical tracks based on the pin-plan specification 1210, which orders tracks to be in a pattern of, e.g., half-shielded or unshielded.

At block 1306, track and layer assignment is performed. Each net of the netlist is assigned to a metal layer and to a logical track within that metal layer. Hence, a net can be associated with pins and a logical track. The logical track and corresponding net can be assigned to the highest metal layer to which a pin associated with the net is assigned. For example, if a logical track corresponds to a net between a pin of a port of a system IP hardblock that is assigned to the M15 metal layer and a pin of a port of a routing IP hard block that is assigned to the M8 metal layer, the logical track can be assigned to the M15 metal layer. The assignment of nets to metal layers and logical tracks can also be based on the track-group specification 1220. The track-group specification 1220 can identify which nets are to have metal tracks that are to be half-shielded and which nets are to have metal tracks that are to be unshielded. Accordingly, the hardware design tool 1124 can assign nets that are to be half-shielded to logical tracks that are ordered to be half-shielded in the bus plan, and can assign nets that are to be unshielded to logical tracks that are ordered to be unshielded in the bus plan. At this point, the logical tracks have not been physically routed, and some logical tracks may logically cross at an instance in a metal layer. Such instances are identified for subsequent buffer bank insertion.

Figure 16:
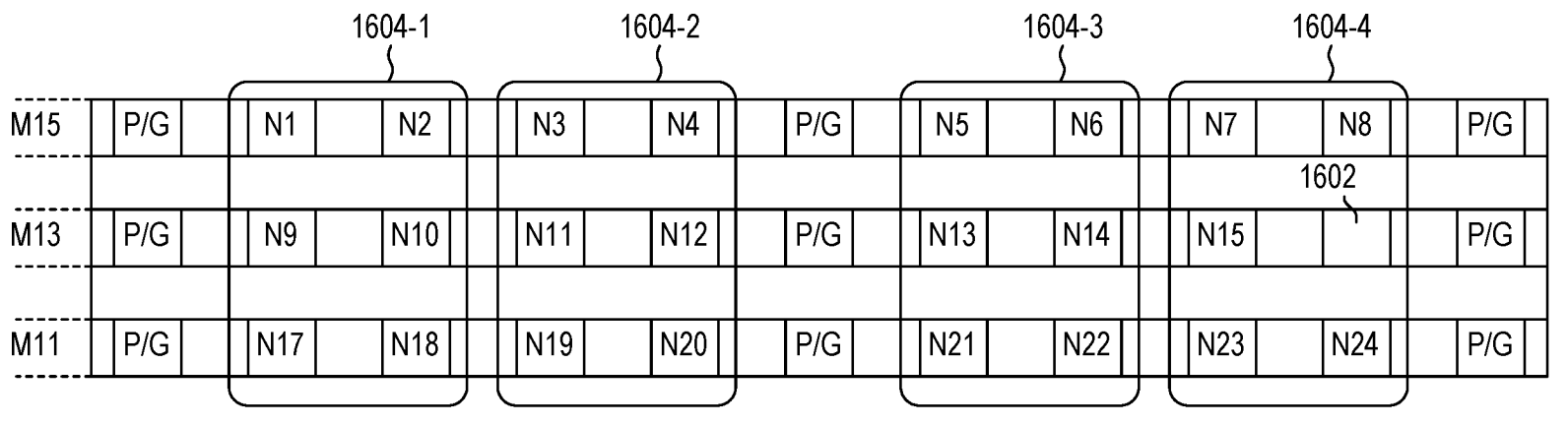

At block 1308, nets are grouped, and buffer banks are assigned. FIG. 16 illustrates aspects of grouping nets as an example. FIG. 16 shows a cross-section of logical tracks assigned to respective metal layers and arranged according to the bus plan as an example. The cross-section also shows power or ground tracks P/G (e.g., power/ground node metal tracks 302). Metal layer M15 is assigned logical tracks corresponding to nets N1 through N8. Metal layer M13 is assigned logical tracks corresponding to nets N9 through N15. Metal layer M11 is assigned logical tracks corresponding to nets N17 through N24. Metal layer M13 also has a logical track 1602 that is not assigned a net. The logical tracks are grouped together into respective groups 1604-1, 1604-2, 1604-3, 1604-4. The number of tracks in each group 1604, in this example, does not exceed the number of nets that can be routed through a buffer bank. In some examples, each group 1604 does not exceed six nets corresponding to six nets that may be routed through example buffer banks shown in FIGS. 5 through 8. Further, the number of tracks in each group 1604 that are in a single metal layer may not exceed some number. In the context of the illustrated example buffer banks shown in FIGS. 9, 10A and 10B, no more than two tracks per metal layer are grouped in a group 1604. Additionally, a group 1604 may be created with a logical track 1602 that is not assigned a net. As an example, grouping can start at power/ground tracks P/G vertically aligned in the metal layers M11, M13, M15 and group two nets corresponding the next two logical tracks to the right of the power/ground track P/G for the metal layer. In some examples, two or more of (i) a logical track having an assigned net, (i) an unassigned track, or (iii) a combination thereof in each metal layer of multiple metal layers (e.g., M11, M13, and M15 metal layers) can be grouped together. In some examples, nets that have logical tracks that cross in a same metal layer are not grouped in different groups, but are grouped in a same group. In other examples, routing and/or insertion of buffer banks can accommodate grouping nets that have logical tracks that cross in a same metal layer to be grouped together.

One or more buffer banks can then be assigned to each group 1604. The directionality of signals on the tracks of a group 1604, including whether logical tracks cross, as identified at block 1306, can determine which of the buffer banks are assigned to the group 1604. For example, if all of the logical tracks in a group are to have signals that propagate in a same direction and none of the logical tracks in that group cross, the cell pin layout 502 of FIG. 5 for a buffer bank can be assigned to that group. If logical tracks in each metal layer of a group cross and all of the logical tracks in that group are to have signals that propagate in a same direction, the cell pin layout 702 of FIG. 7 for a buffer bank can be assigned to that group. Other buffer banks can be assigned based on the characteristics of each given group. The types of buffer banks that can be assigned to a group can be provided, for example, by the buffer bank cell layouts 1218.

Figure 17:
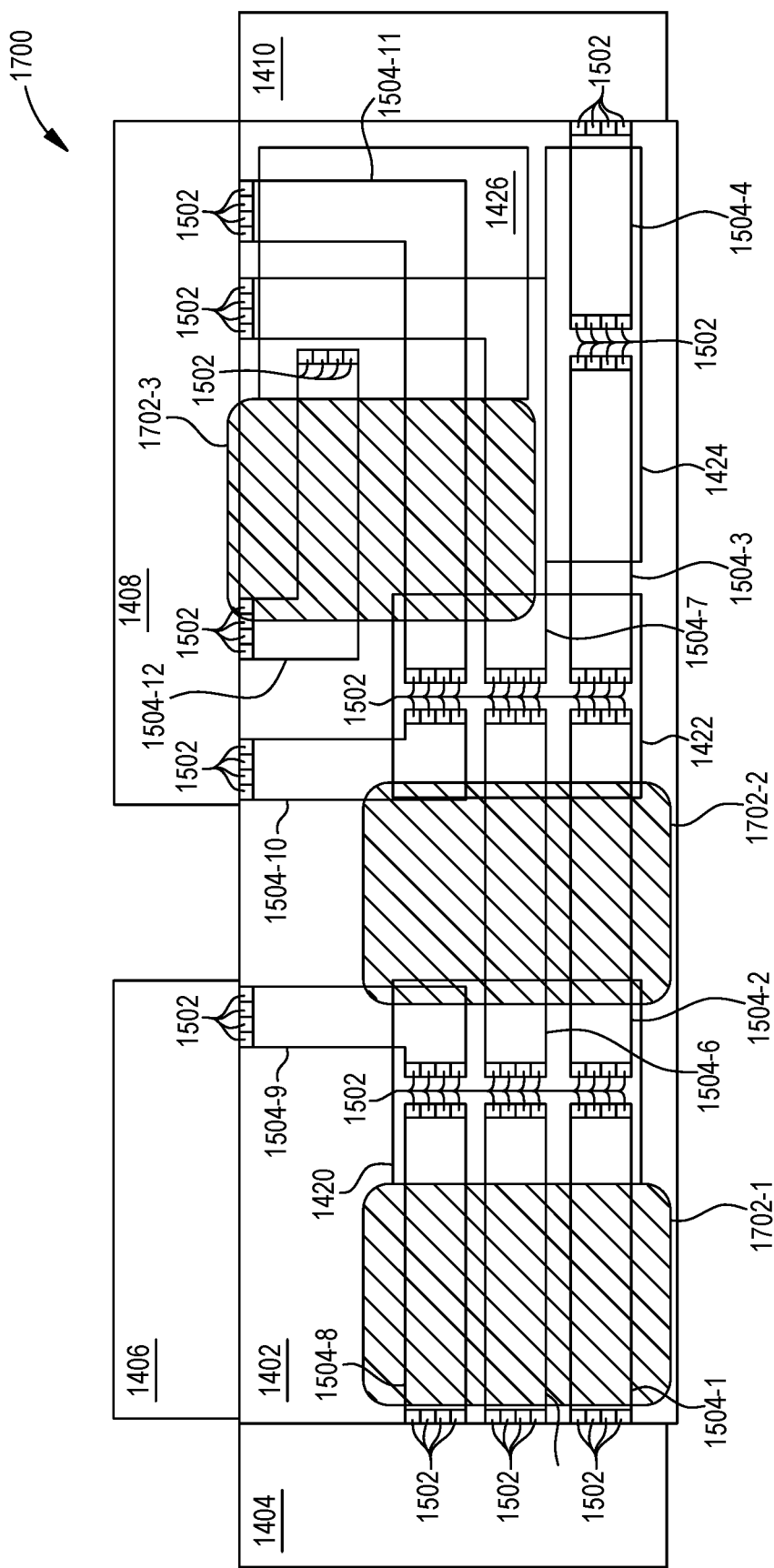
FIG. 17 is an intermediate layout that includes buffer placement regions according to some examples.

At block 1310, buffer banks are inserted. Buffer placement regions can be generated for the placed layout. FIG. 17 illustrates an intermediate layout 1700 that includes buffer placement regions for illustrative purposes. The routing region 1402 within the intermediate layout 1700 includes the routing IP hardblocks 1420-1424, as described above. Buffer placement regions 1702-1, 1702-2, 1702-3 are defined generally within the routing region 1402 and between or outside of the routing IP hardblocks 1420-1424. The buffer placement regions can be placed in the placed layout contemporaneously with the placement of other IP hardblocks in some examples. In other examples, the buffer bank regions 1212 can separately define placement of the buffer placement regions in the layout, which can be inserted in the layout.

Figure 18:
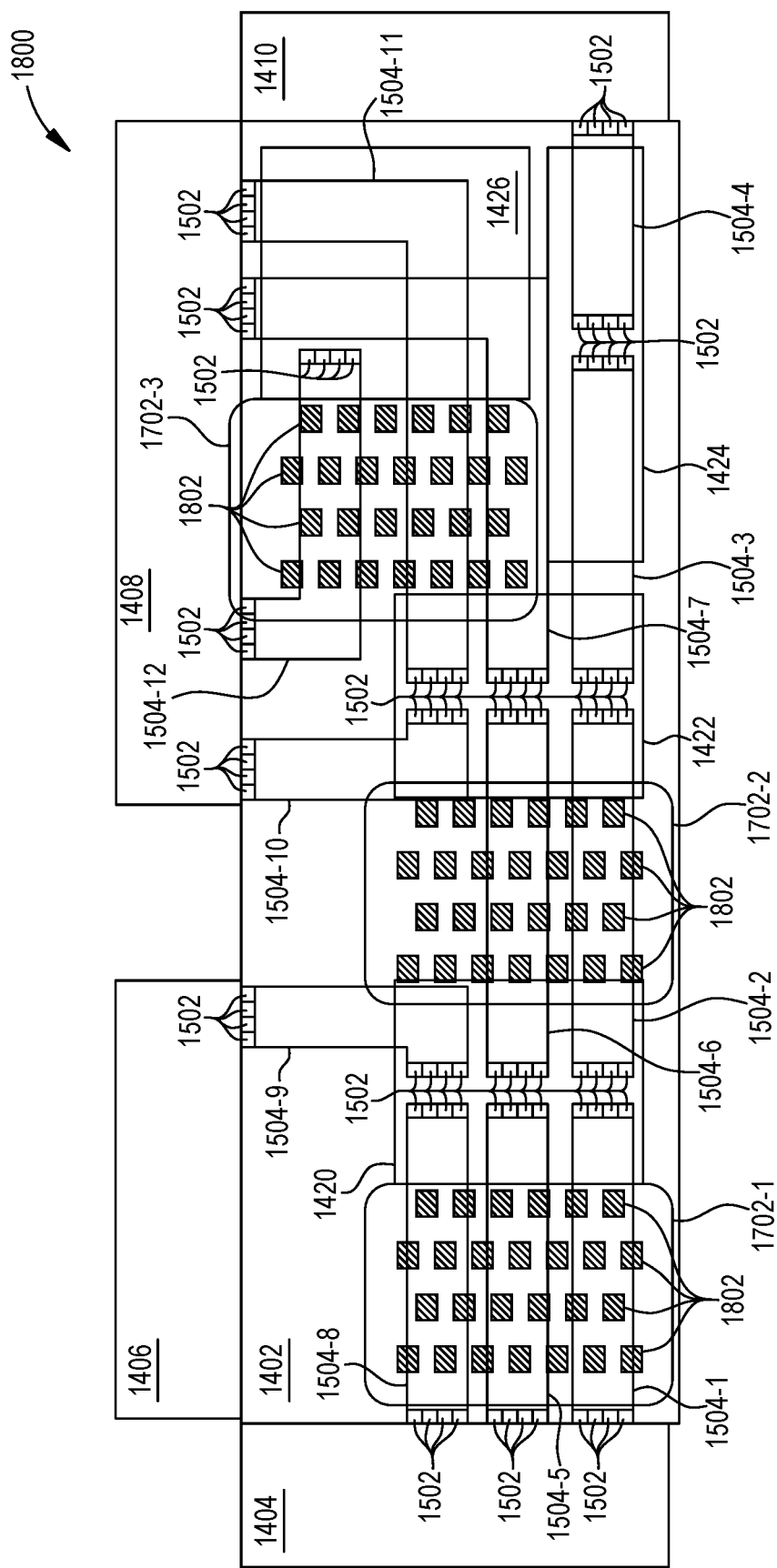
FIG. 18 is an intermediate layout with buffer placement regions, each with a grid of locations where a buffer bank may be placed according to some examples.

Within each buffer placement region, a grid is defined that identifies locations within each buffer placement region that a buffer bank may be inserted. FIG. 18 illustrates an intermediate layout 1800 with buffer placement regions 1702-1, 1702-2, 1702-3, each with a grid of locations 1802 where a buffer bank may be placed. The grid of locations in the buffer placement regions can be placed in the placed layout contemporaneously with the placement of other IP hardblocks in some examples. In other examples, the buffer bank grid 1216 can separately define a grid of locations that can be inserted in each buffer placement regions in the layout. Where a group 1604 that is assigned a buffer bank intersects with a location of the grid within a buffer placement region, an instance of the assigned buffer bank can be inserted at that location. The location where a buffer bank is inserted can also be based on timing constraints of the tracks of the group 1604. For example, if too many buffer banks are inserted for a given group, the timing of signals propagating along those tracks can be delayed by the buffers causing the tracks to not meet a timing constraint. The insertion of buffer banks can balance delay of signal propagation with signal degradation that may occur when too few buffer banks are inserted. The arrangement of an inserted buffer bank can be such that the pins of the buffer bank that are aligned in two columns (like in FIGS. 5 through 8) are parallel to a direction that the respective groups of logical tracks (for which the buffer bank is inserted) extends.

Insertion of a buffer bank can cause a logical track and corresponding net to be divided or separated into multiple logical tracks and corresponding nets, for each track and net of the group for which the buffer bank is inserted. The logical tracks and nets can be associated with pins of the inserted buffer bank. Any crossing of logical tracks in a metal layer can occur within the inserted buffer bank, and hence, instances of tracks crossing in a metal layer can be removed by insertion of buffer banks. The pins of the inserted buffer bank can be at an intermediate metal layer (e.g., M8 metal layer), as described above with respect to FIGS. 10A and 10B. In some examples, an intermediate metal layers can have a resistance of a metal track that is three times less than resistance of a metal track in lowest metal layer, e.g., a M0 or M1 metal layer, or less resistance.

At block 1312, the logical tracks are routed on the physical layout. Transitions from pins at IP hardblocks to metal layers to which corresponding logical tracks are assigned are generated. A route comprising a metal track with a shortest Manhattan distance between where pins are transitioned to the corresponding metal layer is generated in the metal layer for a logical track. Any short circuits (e.g., any overlap of routes on a given metal layer) are identified, and the short circuited routes are re-routed until no short circuits are present.

At block 1314, a design rule check and clean-up is performed. The layout (comprising the metal tracks that were routed) is the analyzed against design rules to ensure that, e.g., minimum spacings between metal tracks are met and that constraints (e.g., timing constraints) are met. Any instance of a design rule not being met is then corrected by a clean-up process. The representation of a hardware design is then output as a result of the method of FIG. 13.

A chip having the circuit can then be fabricated using the representation of the hardware design. Appropriate semiconductor processing can be performed to fabricate the circuit based on the representation of the hardware design.

A hardware design generated by some examples can have increased utilization in metal layers, such as the M11 through M15 metal layers. Constraining routing up to an intermediate metal layer (e.g., the M8 metal layer) in buffer banks can reduce randomness of routing metal tracks and can direct routing metal tracks in higher metal layers (e.g., the M11 through M15 metal layers). Some examples that have been implemented have realized greater utilization in the M11, M13, and M15 metal layers. In one implementation, 97% of nets had at least 95% of their respective route length routed in the designed metal layer of the respective net. Additionally, 96% of nets had less than a 5% detour from their respective designated metal layer. This permits a lower area to be implemented in the fabricated chip.

Additionally, signal on the routed metal tracks had increased speeds and reduced degradation. The reduced resistance of the upper metal layers permit signals to propagate with reduced RC delay and reduced voltage drop due to resistance. Distances between flip-flops for pipelining was greatly increased. This permits low latency in propagating signals.

Further, with a greater percentage of propagation of signals being routed on higher metal layers, electromigration can be reduced. The higher metal layers can have a greater cross-section than lower metal layers. Hence, current density of signal propagating on the metal tracks of the higher metal layers can be reduced, which can result in lower electromigration. Additionally, the reduced resistance in the upper metal layers can result in less heat generation, which can in turn result in lower electromigration.

While the foregoing is directed to specific examples, other and further examples may be devised without departing from the basic scope thereof, and the scope thereof is determined by the claims that follow.

What is claimed is:

1. A method for routing in a hardware design, the method comprising:
using a processor-based system to:
identifying pins of ports of hardblocks placed in a representation of a placed layout;
generating logical tracks for nets associated with the pins of the ports, each of the logical tracks being assigned to a metal layer of a plurality of metal layers, the plurality of metal layers including higher metal layers, lower metal layers, and a middle layer disposed between the higher metal layers and lower metal layers;
grouping the logical tracks and the corresponding nets into respective groups;
inserting one or more buffer banks into the placed layout, each of the one or more buffer banks being for one of the groups of logical tracks and dividing each logical track and corresponding net of the one of the groups of logical tracks, each of the one or more buffer banks having pins associated with the respective divided nets, each of the pins of the one or more buffer banks being assigned to a middle or higher metal layer of the plurality of metal layers, wherein each of the one or more buffer banks includes one or more diodes, each of the one or more diodes has a cathode connected to an input node of a respective buffer of the one or more buffer banks, and each of the one or more diodes has an anode connected to a ground node; and
generating metal tracks in a representation of a hardware layout based on the logical tracks, the pins of the ports, and the pins of the one or more buffer banks, wherein a first resistance of the metal tracks of the middle or higher metal layers is less than a second resistance of the metal tracks of the lower metal layer, and wherein metal tracks in lower metal layers have a decreased thickness and width compared to metal tracks in upper metal layers.

2. The method of claim 1, wherein:
identifying the pins of the ports of the hardblocks further includes identifying buses between respective two or more of the ports, each of the buses being attributed an ordering of logical tracks to be half-shielded and unshielded; and
generating the logical tracks is based on the ordering of logical tracks.

3. The method of claim 2, wherein the placed layout includes a power/ground network in the plurality of metal layers, the logical tracks being generated based on the ordering of logical tracks relative to the power/ground network.

4. The method of claim 1, wherein grouping the logical tracks and corresponding nets into respective groups includes, grouping together, for each group, two or more of logical tracks, an unassigned track, or a combination thereof in each metal layer of multiple metal layers of the plurality of metal layers.

5. The method of claim 1, wherein inserting the one or more buffer banks includes:
determining a type of a buffer bank from a plurality of types to be inserted for each of the groups of logical tracks for which a buffer bank is to be inserted, the type of the buffer bank being based on directionality of signals of the logical tracks of the respective group of logical tracks;
identifying buffer placement regions in the placed layout;
identifying a grid of locations in each of the buffer placement regions where a buffer bank is capable of being inserted; and
inserting a buffer bank for a group of logical tracks where the group of logical tracks intersects a location of the grid in one of the buffer placement regions.

6. The method of claim 5, wherein the plurality of types includes a uni-directional pass through cell pin layout buffer bank, a bi-directional pass through cell pin layout buffer bank, a uni-directional cross-over cell pin layout buffer bank, and a bi-directional cross-over cell pin layout buffer bank.

7. The method of claim 1, wherein, for each of the one or more buffer banks, the pins of the respective buffer bank are constrained within an area of the respective buffer bank.

8. The method of claim 1, wherein for each of the one or more buffer banks, the pins of the respective buffer bank are aligned in two columns, the respective buffer bank being inserted such that the two columns are parallel to a direction that the respective one of the groups of logical tracks extends.

9. A hardware design system comprising:
a hardware platform comprising a central processing unit (CPU) and a memory; and
a hardware design tool comprising instructions stored on the memory and executable by the CPU in the hardware platform, the hardware design tool configured to:
identify pins of ports of hardblocks placed in a representation of a placed layout;
generate logical tracks for nets associated with the pins of the ports, each of the logical tracks being assigned to a metal layer of a plurality of metal layers, the plurality of metal layers including higher metal layers, lower metal layers, and a middle layer disposed between the higher metal layers and lower metal layers;
group the logical tracks and the corresponding nets into respective groups;
insert one or more buffer banks into the placed layout, each of the one or more buffer banks being for one of the groups of logical tracks and dividing each logical track and corresponding net of the one of the groups of logical tracks, each of the one or more buffer banks having pins associated with the respective divided nets, each of the pins of the one or more buffer banks being assigned to a middle or higher metal layer of the plurality of metal layers, wherein each of the one or more buffer banks includes one or more diodes, each of the one or more diodes has a cathode connected to an input node of a respective buffer of the one or more buffer banks, and each of the one or more diodes has an anode connected to a ground node; and
generate metal tracks in a representation of a hardware layout based on the logical tracks, the pins of the ports, and the pins of the one or more buffer banks, wherein a first resistance of the metal tracks of the middle or higher metal layers is less than a second resistance of the metal tracks of the lower metal layer, and wherein metal tracks in lower metal layers have a decreased thickness and width compared to metal tracks in upper metal layers.

10. The hardware design system of claim 9, wherein:
the hardware design tool configured to identify the pins of the ports of the hardblocks is further configured to identify buses between respective two or more of the ports, each of the buses being attributed an ordering of logical tracks to be half-shielded and unshielded; and the logical tracks are generated based on the ordering of logical tracks.

11. The hardware design system of claim 10, wherein the placed layout includes a power/ground network in the plurality of metal layers, the logical tracks being generated based on the ordering of logical tracks relative to the power/ground network.

12. The hardware design system of claim 9, wherein the hardware design tool configured to group the logical tracks and corresponding nets into respective groups is further configured to group together, for each group, two or more of logical tracks, an unassigned track, or a combination thereof in each metal layer of multiple metal layers of the plurality of metal layers.

13. The hardware design system of claim 9, wherein the hardware design tool configured to insert the one or more buffer banks is further configured to:
   determine a type of a buffer bank from a plurality of types to be inserted for each of the groups of logical tracks for which a buffer bank is to be inserted, the type of the buffer bank being based on directionality of signals of the logical tracks of the respective group of logical tracks;
   identify buffer placement regions in the placed layout;
   identify a grid of locations in each of the buffer placement regions where a buffer bank is capable of being inserted; and
   insert a buffer bank for a group of logical tracks where the group of logical tracks intersects a location of the grid in one of the buffer placement regions.

14. The hardware design system of claim 13, wherein the plurality of types includes a uni-directional pass through cell pin layout buffer bank, a bi-directional pass through cell pin layout buffer bank, a uni-directional cross-over cell pin layout buffer bank, and a bi-directional cross-over cell pin layout buffer bank.

15. The hardware design system of claim 9, wherein, for each of the one or more buffer banks, the pins of the respective buffer bank are constrained within an area of the respective buffer bank.

16. The hardware design system of claim 9, wherein for each of the one or more buffer banks, the pins of the respective buffer bank are aligned in two columns, the respective buffer bank being inserted such that the two columns are parallel to a direction that the respective one of the groups of logical tracks extends.

17. A method for routing in a hardware design, the method comprising:
   using a processor-based system to:
      identifying pins of ports of hardblocks placed in a representation of a placed layout, each of the pins of the ports being assigned to a metal layer of a plurality of metal layers, the plurality of metal layers including higher metal layers, lower metal layers, and a middle layer disposed between the higher metal layers and lower metal layers;
      generating logical tracks for nets associated with the pins of the ports, each of the logical tracks being assigned to a highest metal layer of the plurality of metal layers to which a pin associated with the corresponding net is assigned;
      grouping logical tracks assigned to multiple metal layers of the plurality of layers and corresponding nets into respective groups;
      assigning a type of buffer bank selected from a plurality of types of buffer banks to one or more of the groups of logical tracks, the type of buffer bank being selected based on directionality of signals of logical tracks of the respective group of logical tracks;
      inserting a buffer bank corresponding to the type of buffer bank into the placed layout for respective ones of the one or more of the groups of logical tracks, each inserted buffer bank dividing each logical track and corresponding net of the respective group of logical tracks, each inserted buffer bank having pins associated with the respective divided nets, each of the pins of the one or more buffer banks being assigned to a middle or higher metal layer of the plurality of metal layers, wherein each of the buffer banks includes one or more diodes, each of the one or more diodes has a cathode connected to an input node of a respective buffer of the one or more buffer banks, and each of the one or more diodes has an anode connected to a ground node; and
      generating metal tracks in a representation of a hardware layout based on the logical tracks, the pins of the ports, and the pins of the one or more buffer banks, wherein a first resistance of the metal tracks of the middle or higher metal layers is less than a second resistance of the metal tracks of the lower metal layer, and wherein metal tracks in lower metal layers have a decreased thickness and width compared to metal tracks in upper metal layers.

18. The method of claim 17, wherein:
   identifying the pins of the ports of the hardblocks further includes identifying buses between respective two or more of the ports, each of the buses being attributed an ordering of logical tracks to be half-shielded and unshielded; and
   generating the logical tracks is based on the ordering of logical tracks.

19. The method of claim 17, wherein grouping the logical tracks and corresponding nets into respective groups includes, grouping together, for each group, two or more of logical tracks, an unassigned track, or a combination thereof in each metal layer of the multiple metal layers of the plurality of metal layers.

20. The method of claim 17, wherein inserting the one or more buffer banks includes:
   identifying buffer placement regions in the placed layout;
   identifying a grid of locations in each of the buffer placement regions where a buffer bank is capable of being inserted; and
   inserting the buffer bank for the respective group of logical tracks where the respective group of logical tracks intersects a location of the grid in one of the buffer placement regions.

* * * * *